United States Patent [19]

Gavin

[11] Patent Number: 4,575,610

[45] Date of Patent: Mar. 11, 1986

[54] LASER SHIELDING DEVICE

[75] Inventor: James T. Gavin, Cincinnati, Ohio

[73] Assignee: Cincinnati Milacron Inc., Cincinnati, Ohio

[21] Appl. No.: 588,299

[22] Filed: Mar. 12, 1984

[51] Int. Cl.$^4$ .............................................. B23K 26/00
[52] U.S. Cl. ................... 219/121 L; 73/49.3; 250/515.1; 340/550
[58] Field of Search ..... 219/121 L, 121 LM, 121 LL, 219/121 LK; 73/49.3, 52; 340/540, 550; 250/515.1; 350/363

[56] References Cited

U.S. PATENT DOCUMENTS

| 2,747,105 | 5/1956 | Fitzgerald et al. | 250/515.1 |
| 3,871,739 | 3/1975 | Poulsen | 250/515.1 X |
| 4,114,985 | 9/1978 | Friedman | 219/121 L P X |
| 4,136,553 | 1/1979 | Jones | 73/52 |
| 4,277,669 | 7/1981 | Alfanoi et al. | 219/121 LK |
| 4,350,978 | 9/1982 | Riccobono | 340/550 |

FOREIGN PATENT DOCUMENTS 648857  9/1962  Canada ............................... 340/550

Primary Examiner—C. L. Albritton
Assistant Examiner—Alfred S. Keve
Attorney, Agent, or Firm—Thomas M. Farrell

[57] ABSTRACT

A laser shielding device is disclosed, having two spaced-apart layers of shielding material defining a sealed chamber between the two. At least one layer will degrade in the presence of an impinging laser beam, creating a hole through the layer. A pressure change in the chamber is sensed and signaled to a machine controller to stop the lasing operation.

8 Claims, 1 Drawing Figure

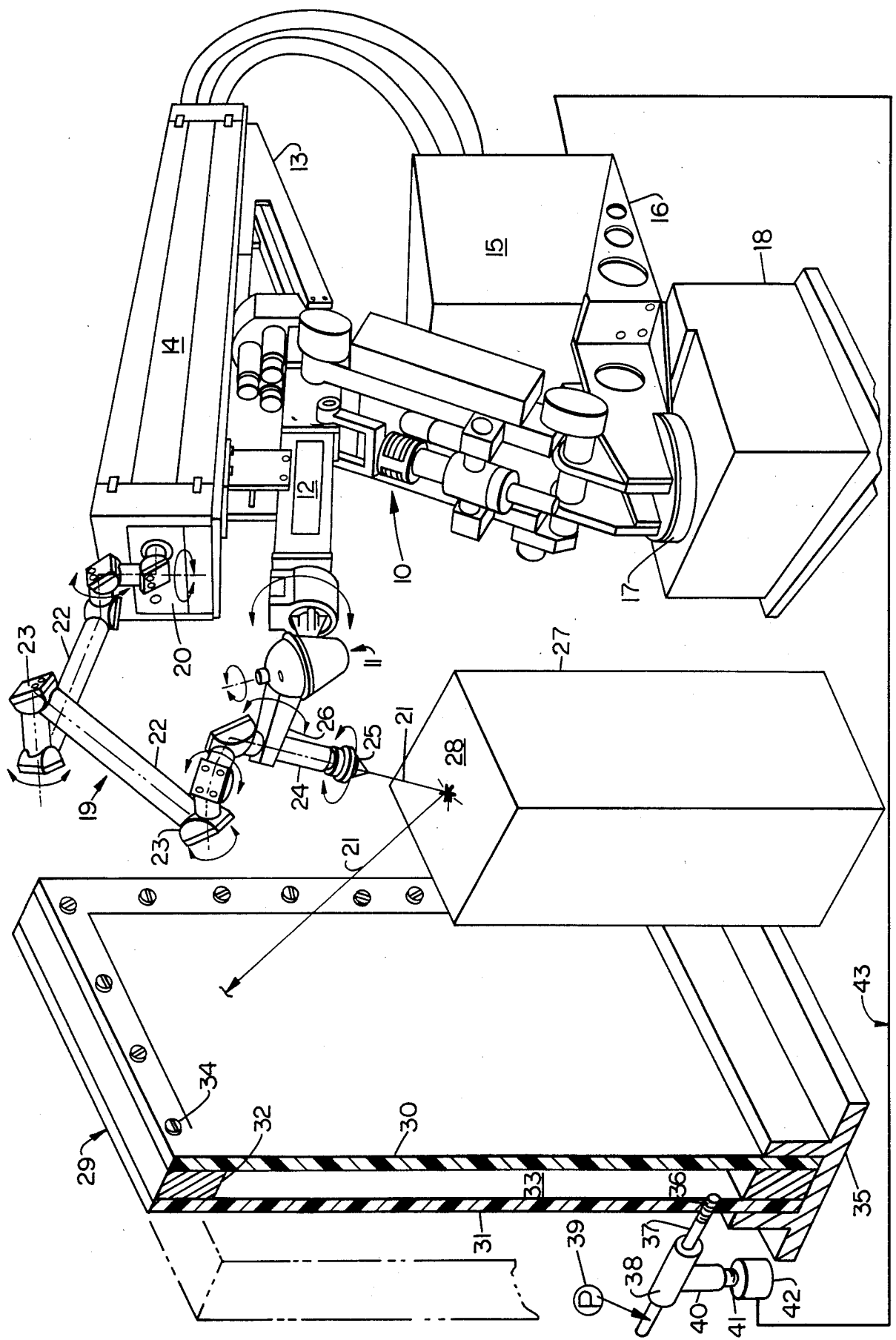

LASER SHIELDING DEVICE

BACKGROUND OF THE INVENTION

This invention relates generally to the field of work zone enclosures for laser beam and for shielding of the environmental areas surrounding laser work zones.

The invention relates in particular to work zones where a wieldable laser gun or focusing apparatus is moved through multispatial orientations when performing operations on a workpiece.

It has been known to use low power laser beams for performing a variety of functions such as aligning machines, wherein a red visible laser beam might be employed to effect the alignment. Such low power laser beams generally present no problem to surrounding areas and personnel. Recently, however, it has become useful to employ what are known as "power lasers" to effect material cutting and welding operations. What is meant by power lasers are those typically, in the neighborhood of 1kw, more or less, which have a light beam capable of burning through material if left on the target spot and, similarly, which are capable of inflicting injury on personnel because of the level of energy employed.

Many types of laser generating media may be employed to effect power lasing, for example, solid lasers (e.g. ruby crystal), and gas lasers (e.g., carbon dioxide) to name several.

Conventional laser cutting and welding apparatus generally employ a fixed laser focus unit with a means for moving a workpiece around with respect to the laser beam. From the advent of robots in the industrial workplace, robots have advanced from being utilized as merely loaders, or part manipulators, to the present state-of-the-art where the robot actually becomes a full process machine having as many as six axes of movement due to advanced wrist designs. These full process robots, are capable of performing many operations, such as precision measurement of a workpiece.

Recently, it has been suggested that the end effector of a robot wrist might be utilized to carry a laser focus unit so that complex operations could be performed on a workpiece through use of a "wieldable" laser, that is, capable of movement through a high degree of multispatial orientations. Many power lasers operate in the infrared or invisible light spectrum, so that personnel may not be able to visually detect the presence or absence of a laser beam such as that emitted by a carbon dioxide laser. Several formidable problems arise when using a wieldable laser, particularly that which emits radiation in the infrared spectrum: (1) The laser beam may be directed at surfaces other than in the work zone by improper focusing on the target; or (2) the laser beam, which is reflectable radiation, may strike a reflective surface and be redirected to a point outside the work zone. As a result of these problems, injury to personnel and damage to environmental points outside the work zone may occur. It has been known in the robot industry, at least on an experimental basis, that a single layer of shielding material might be employed around a laser work zone, to protect the environment from a stray laser beam. Ideal shielding materials should be capable of absorbing at least a portion of the laser beam energy.

The carbon dioxide laser is probably the most widely used and versatile type of power laser in use. It can emit infrared radiation at many discrete wave lengths between nine and eleven micrometers. While carbon dioxide gas is the light emitter, $CO_2$ lasers usually contain a mixture of other gases together with carbon dioxide to accomplish the lasing of light. The internal workings of $CO_2$ (and other types) power lasers is generally of no concern to the shielding designer, provided that the wave length of the emitted light is known for shielding purposes. It is known that ordinary glass will totally absorb 10.6 micrometer energy and, in fact, can be cut with $CO_2$ lasers. Conversely, many optical materials are transparent at 10 micrometers but do not transmit visible light very well. It is preferable in many cases to have shield which is transparent to the human eye so that the work zone may be viewed while the operation is being performed.

Single shielding layers of a thermoplastic material such as transparent acrylic, commonly available under the trademarks LEXAN and PLEXIGLAS have been successfully employed for shielding a power laser beam, because the material will absorb at least a portion of the laser beam and will degrade accordingly. For example, a power laser beam in the range of 1kw will take approximately 15 seconds to burn through a ¼ inch thickness acrylic plastic. Personnel in laboratory situations can readily detect the discoloration occurring on a portion of a plastic shield, and generally have sufficient time to shut down the system and find the fault in misdirection of the laser beam. Obviously such a scheme depends totally on manual intervention.

Applicant has obviated many difficulties inherent in the laboratory attempts to shield a laser beam work zone and visibly detect a stray laser beam, by designing an automatic device which will, upon continued presence of a stray laser beam, provide a signal which is indicative of the fault condition, and which is capable of automatically initiating a machine shut down condition.

It is therefore an object of the present invention to provide an automatic sensing system for shielding a laser work zone.

Another object of the present invention is to provide a signaling device to indicate a laser direction fault condition.

Still another object of the present invention is to provide a shielding device for a laser work zone which is capable of sensing and signaling a laser fault condition, wherein the signal may be utilized for a variety of purposes, including actuating an alarm such as an annunciator or visual device for machine personnel, and for initiating a shut down of the lasing apparatus.

SUMMARY OF THE INVENTION

The invention is shown embodied in a laser shielding device wherein first and second shielding layers are held in structure with a means for spacing the layers from one another and creating a chamber between the two. At least one layer is comprised of material capable of absorbing at least a portion of a laser light beam and degrading in the presence of the beam. A pressure source is connected to the chamber created between the two shielding layers, and means is provided for sensing and signaling a pressure change in the chamber.

DESCRIPTION OF THE DRAWINGS

The single drawing FIGURE depicts a wieldable laser gun having a laser beam shielding device near the laser work zone.

DESCRIPTION OF THE PREFERRED EMBODIMENT

Referring to the drawing FIG., there is shown an industrial robot 10 of the kind depicted in U.S. Design Pat. No. 269,681 and having a wrist device 11 such as that shown and described in U.S. Pat. No. 4,068,536. The forearm 12 of the industrial robot 10 has a bracket 13 adapted thereto for carrying a laser generator 14, such as the $CO_2$ laser depicted. The power unit 15 for the laser generator 14 is carried on a special bracket 16 fixed to the rotatable shoulder joint 17 carried on the robot base 18. The laser generator 14 utilizes a light pipe system 19, mounted to its forward end 20, to direct a laser beam 21 through serially-related light pipes 22 joined at articulations 23, or reflective joints, which might employ totally reflecting mirrors. The terminal part 24 of the light pipe system 19 utilizes a focusing unit 25 to converge the light beam 21 on a target or work zone. The focusing unit 25 is carried by the robot wrist end effector 26 so that the laser beam 21 will be "wieldable", i.e., manipulatable through movements comprising multispatial orientations.

An exemplary workpiece has not been shown, but rather a work support base 27 is depicted having a reflective top surface 28. An improperly focused or misdirected light beam 21 may be reflected off the top surface 28 and continue on to an environmental area outside the work zone.

To interrupt the travel of the misdirected light beam 21, a laser shielding device 29 is shown in conjunction with the laser work zone in broken-away cross-sectional. The laser shielding device 29, in its simplest constructed form, comprises a fabricated structure having first and second spaced apart layers 30,31 of laser shielding material. The layers 30,31 are separated by a continuous spacer 32 which maintains a constant space between the layers 30,31 and which serves to create an enclosed chamber 33 between the two layers 30,31. The layers 30,31 are fastened to the spacer 32 by a plurality of screws 34. The laser shielding device 29 further employs a channel-shaped member 35 at its bottom edge for supporting the device 29 in a vertical orientation.

A fluid port 36 is provided in the second layer 31 of material, and a pipe 37 and tee 38 are shown connected from the port 36 to an air pressure source 39. The air pressure source 39 serves to pressurize the enclosed chamber 33 to a point just above atmospheric pressure, so as not to distort the shielding layers 30,31. The tee 38 has a side outlet 40 connected by a suitable pipe nipple 41 to a pressure switch 42 which may be any of a number of commercial switches well-known in pneumatic art. The pressure switch has pair of internal contacts (not shown) which are used for creating a signal on an output line 43 when a pressure change occurs within the enclosed chamber 33. The output line 43 is shown connected to the laser generator power unit 15 so that, upon sensing a pressure drop in the enclosed chamber, the laser beam will be turned off.

It may be appreciated by those skilled in the art, that the signal line 43 may be similarly provided to a robot control (not shown) to cease movements of the robot 10, and/or the line 43 may be connected to a personnel alarm, such as an annunciator or flashing red light, to indicate a pressure drop in the enclosed chamber 33.

The pressure drop signaling a fault condition occurs by virtue of the laser beam 21 striking the first shielding layer 30. Continuous absorption of at least a portion of the laser beam 21 will cause a degradation to take place and subsequently a hole will be generated through the first laser shielding layer 30 and escape of air pressure will occur. The first shielding layer 30 is selected to be compatibly matched with absorption of the laser light employed in the operation. In the preferred embodiment, a $CO_2$ laser source is utilized which emits light in the infrared spectrum in the range of 9 to 11 micrometers. Common glass might have been employed as the first shielding layer 30, wherein total of any $CO_2$ light beam of 10.6 micrometer wave length would occur, but the shielding layer may tend to crack and possibly shatter. A more suitable material for the purpose is acrylic plastic, in the thickness of $\frac{1}{4}$ inch, where the laser beam impingement will cause discoloration and burning through after approximately 15 seconds. The second shielding layer 31 may be any of a variety of materials, which may be opaque or transparent. However, for additional safety in controlling the stray laser beam, acrylic plastic becomes a very suitable material for the second shielding layer 31, as well.

Several advantages are had when using the desirable acrylic plastic layers: (1) a lightweight structure is formed which may be easily supported and moved about with respect to the laser work zone; (2) transparent acrylic plastic may be employed so that personnel may be easily able to view the laser work zone.

While the invention has been shown in connection with a preferred embodiment, it must be additionally noted that variations on the embodiment may be employed without departing from the scope and nature of the present invention. For instance, negative pressure might be employed within the enclosed work chamber 33 and yet still be active to operate a sensing and signaling means such as the pressure switch or a substitute therefor. Another variation is to fill the chambers 33 with a colorless gas under low pressure which, when released, could be detected with an electronic monitor, i.e. "sniffer", capable of detecting low concentrations (ppm).

Additionally, while planar sheet members have been shown to depict the laser shielding layers 30,31, it may be appreciated that curved or specially molded shaped might be employed around the laser work zone, so long as a substantially enclosed chamber 33 is formed between the two shielding layers 30,31. It may be further appreciated that additional layers of laser shielding material may be employed for increased reliability and safety.

The invention as shown and described in the foregoing preferred embodiment is not intended to be limited to said embodiment, but rather the invention extends to all such designs and modifications as come within the scope of the appended claims.

What is claimed is:

1. A shielded laser robot system, comprising in combination:
   (a) a work zone target;
   (b) robotic means proximate to said work zone target for automatically wielding a laser beam through multi-angle spatial orientations while aiming said beam at said work zone target; and
   (c) a laser beam shielding device proximate to said work zone target, said shielding device comprising:
      (1) a first shielding layer comprised of material capable of absorbing at least a portion of a laser light beam and degrading in the presence of said beam, (2) a second shielding layer,
(3) means for spacing said first and second layers from one another and for creating a substantially enclosed chamber between the two layers,
(4) a pressure source port in fluid communication with said chamber, and
(5) means for sensing and signalling a pressure change in said chamber wherein a pressure level may be maintained in said chamber until said first shielding layer is degraded through, causing a pressure chamber leak.

2. The laser shielding device of claim 1, wherein said first layer is comprised of thermoplastic material.

3. The laser shielding device of claim 1, wherein said means for sensing and signaling comprises, in part, a pressure switch connected to said chamber.

4. The laser shielding device of claim 3, wherein said means for sensing and signaling further comprises, in part, an alarm.

5. The laser shielding device of claim 3, wherein said means for sensing and signaling further comprises, in part, a machine inhibit signal connected to a machine controller.

6. The laser shielding device of claim 1, further comprising support means for positioning said laser shielding device with respect to a laser working zone.

7. The laser shielding device of claim 1, wherein said first and second layers are substantially flat sheets.

8. A shielded laser robot system, comprising in combination:
(a) a work zone target;
(b) robotic means proximate to said work zone target for automatically wielding a laser beam through multi-angle spatial orientations while aiming said beam at said work zone target; and
(c) a laser beam shielding device proximate to said work zone target, said shielding device comprising:
(1) a first shielding layer comprised of thermoplastic material capable of absorbing at least a portion of a $CO_2$ laser beam having a wavelength in the range of 9–11 micrometers and degrading in the presence of said beam,
(2) a second shielding layer,
(3) means for spacing said first and second layers from one another and for creating a substantially enclosed chamber between the two layers,
(4) a pressure source port in fluid communication with said chamber,
(5) a pressure switch for sensing and signaling a pressure change in said chamber,
(6) a pressure source means for maintaining a pressure level in said chamber, and
(7) means for supporting and positioning said shielding layers with respect to a laser working zone.

* * * * *